United States Patent
Gupta

(10) Patent No.: US 9,516,178 B2
(45) Date of Patent: Dec. 6, 2016

(54) MULTIPLE MEDIA FORMAT SUPPORT FOR PRINTERS

(75) Inventor: Vivek Kumar Gupta, Rohini (IN)

(73) Assignee: Marvell World Trade Ltd., St. Michael (BB)

(*) Notice: Subject to any disclaimer, the term of this patent is extended or adjusted under 35 U.S.C. 154(b) by 285 days.

(21) Appl. No.: 11/857,081

(22) Filed: Sep. 18, 2007

(65) Prior Publication Data

US 2008/0071932 A1 Mar. 20, 2008

Related U.S. Application Data

(60) Provisional application No. 60/826,265, filed on Sep. 20, 2006.

(51) Int. Cl.
*G06F 3/00* (2006.01)
*H04N 1/00* (2006.01)
*G06F 3/12* (2006.01)
*G06F 3/06* (2006.01)

(52) U.S. Cl.
CPC ........ *H04N 1/00278* (2013.01); *G06F 3/1206* (2013.01); *G06F 3/128* (2013.01); *G06F 3/1247* (2013.01); *G06F 3/0659* (2013.01); *H04N 2201/0027* (2013.01); *H04N 2201/0044* (2013.01); *H04N 2201/0084* (2013.01); *H04N 2201/0087* (2013.01); *H04N 2201/33378* (2013.01)

(58) Field of Classification Search
None
See application file for complete search history.

(56) References Cited

U.S. PATENT DOCUMENTS

| | | | |
|---|---|---|---|
| 6,665,092 B2* | 12/2003 | Reed | H04N 1/00278 358/1.6 |
| 6,950,198 B1* | 9/2005 | Berarducci | G06Q 30/0601 358/1.12 |
| 6,954,280 B1* | 10/2005 | Kaibara | 358/1.15 |
| 7,170,552 B2* | 1/2007 | Parulski et al. | 348/207.2 |
| 7,206,812 B2* | 4/2007 | Kogure et al. | 709/206 |
| 7,268,904 B2* | 9/2007 | Matsumoto | 358/1.15 |
| 7,286,256 B2* | 10/2007 | Herbert | 358/1.16 |
| 7,295,244 B2* | 11/2007 | Manico et al. | 348/373 |
| 7,319,480 B2* | 1/2008 | Akiyama et al. | 348/220.1 |

(Continued)

FOREIGN PATENT DOCUMENTS

| | | |
|---|---|---|
| WO | WO2004/006084 A | 1/2004 |
| WO | WO2004/050374 A | 6/2004 |

OTHER PUBLICATIONS

Canon Inc. et al., "Summary of DPOF Version1.10", Publisher: Canon Inc., Date: Jul. 17, 200, 7 pages.*

(Continued)

*Primary Examiner* — Henry Tsai
*Assistant Examiner* — Christopher Bartels

(57) ABSTRACT

A system for operating a multiple media printing device includes a memory module that stores print control data that corresponds to a plurality of data storage formats, a media reader module that selects one of the plurality of data storage formats based on one of a plurality of files stored on an external media storage device, and a media format module that processes image data stored on the media storage device based on the print control data that corresponds to the selected data storage format.

10 Claims, 4 Drawing Sheets

(56) References Cited

U.S. PATENT DOCUMENTS

| | | | |
|---|---|---|---|
| 8,244,179 B2* | 8/2012 | Dua | G06F 17/30058 340/10.51 |
| 2002/0021361 A1* | 2/2002 | Kitajima et al. | 348/232 |
| 2002/0025085 A1* | 2/2002 | Gustafson et al. | 382/311 |
| 2002/0145752 A1* | 10/2002 | Hanabusa et al. | 358/1.15 |
| 2002/0167687 A1* | 11/2002 | Tsai | 358/402 |
| 2002/0176109 A1* | 11/2002 | Matsumoto | 358/1.15 |
| 2003/0084221 A1* | 5/2003 | Jones et al. | 710/302 |
| 2003/0193578 A1* | 10/2003 | Parulski | H04N 5/765 348/220.1 |
| 2004/0141083 A1* | 7/2004 | Takashima | 348/333.01 |
| 2004/0179219 A1* | 9/2004 | Wong et al. | 358/1.13 |
| 2004/0201690 A1* | 10/2004 | Bryant et al. | 348/207.1 |
| 2004/0212831 A1* | 10/2004 | Imai et al. | 358/1.16 |
| 2005/0062999 A1* | 3/2005 | Fujinaga | 358/1.14 |
| 2005/0069295 A1* | 3/2005 | Kim | G06F 17/30056 386/201 |
| 2005/0111034 A1* | 5/2005 | Karasaki | H04N 1/00132 358/1.15 |
| 2005/0122539 A1* | 6/2005 | Sugimoto | 358/1.15 |
| 2005/0140789 A1* | 6/2005 | Yasuda | 348/207.2 |
| 2005/0195975 A1* | 9/2005 | Kawakita | H04L 9/0822 380/30 |
| 2005/0213130 A1* | 9/2005 | Bender et al. | 358/1.13 |
| 2005/0243362 A1* | 11/2005 | Sakuda et al. | 358/1.15 |
| 2005/0254072 A1* | 11/2005 | Hirai et al. | 358/1.2 |
| 2006/0001930 A1* | 1/2006 | Yeh | H04N 1/00291 358/527 |
| 2006/0004822 A1* | 1/2006 | Kim et al. | 707/101 |
| 2006/0028673 A1* | 2/2006 | Ryu | G06F 3/1206 358/1.15 |
| 2006/0044949 A1* | 3/2006 | Ferlitsch | H04N 1/00222 369/30.01 |
| 2006/0126102 A1* | 6/2006 | Sakuda | 358/1.15 |
| 2006/0268305 A1* | 11/2006 | Kadota | 358/1.13 |
| 2006/0282684 A1* | 12/2006 | Kakoi et al. | 713/193 |
| 2006/0288071 A1* | 12/2006 | Bigioi | H04L 12/2803 709/203 |
| 2007/0002356 A1* | 1/2007 | Ha | G06F 3/1205 358/1.13 |
| 2007/0013937 A1* | 1/2007 | Kim | G06F 3/1205 358/1.13 |
| 2007/0052995 A1* | 3/2007 | Kudlu et al. | 358/1.15 |
| 2007/0086036 A1* | 4/2007 | Tanaka | 358/1.13 |
| 2007/0244580 A1* | 10/2007 | Ahne et al. | 700/83 |
| 2008/0004075 A1* | 1/2008 | Horton | H04N 1/00132 455/557 |
| 2008/0030608 A1* | 2/2008 | Yoshizawa et al. | 348/333.01 |
| 2008/0056468 A1* | 3/2008 | Fredlund | H04N 1/324 379/93.01 |
| 2008/0079654 A1* | 4/2008 | Silverbrook | 345/1.1 |
| 2008/0297824 A1* | 12/2008 | Mizuno | 358/1.13 |

OTHER PUBLICATIONS

Communication from PCT dated Feb. 19, 2008 transmitting International Search Report for Application No. PCT/IB2007/002714; 5 pages.

Agilent Technologies; ADCM-2600 Series; Portrait VGA Camera Modules; Technical Specification; Revision 0.20; Oct. 10, 2001; 289 pages.

UPnP Forum; Printer: 1 Device Template Version 1.01; Annex A—Optical Service Addition Version 1.0; 2005; 4 pages.

Charles Poynton Color technology; Poynton's Gama FAQ and Color FAQ; updated Feb. 27, 1999; 3 pages.

Graphics Poynton's Color FAQ; http://www.inforamp.net/~poynton/notes/colour_and_gama/ColorFAQ.html; Author: Charles Poynton; Sep. 19, 2007; 2 pages.

OSTA.org—Optical Storage Technology Association; Digital Music, Photo, and Video Collections; MPV™; Dublin Core-Normalized Metadat Format Profile Specification; Revision 1.01; Mar. 11, 2003; 97 pages.

DPS Specification; Version 0.9; DRAFT; Canon Inc.; Hewlett-Packard Company; Seiko Epson Corporation; Sony Corporation; Dec. 2, 2002; 108 pages.

CIPA; Logo Certification Guidelines for CIPA DC-001—2003; Digital Photo Solutions for Imaging Devices V1.00; May 6, 2003; Published by Camera & Imaging Products Association; 25 pages.

XML Schema for CIPA DC-001-2003; Mar. 10, 2003; Canon Inc., Hewlett-Packard Company, Seiko Epson Corporation and Sony Corporation; 40 pages.

Errata for "CIPA DC-001-2003 Feb. 3, 2003" as of Apr. 4, 2003; 2 pages.

OSTA.org—Optical Storage Technology Association; Digital Music, Photo, and Video Collections; MPV™, MPV Interoperability Specification; Revision 1.0; Jul. 25, 2005; 56 pages.

OSTA.org—Optical Storage Technology Association; Digital Music, Photo, and Video Collections; MPV™, MPV Portable Storage Specification; Revision 1.00; Aug. 9, 2005; 36 pages.

OSTA.org—Optical Storage Technology Association; Digital Music, Photo, and Video Collections; MPV™, MPV Basic Profile Specification; Revision 1.01; Mar. 11, 2003; 19 pages.

OSTA.org—Optical Storage Technology Association; Digital Music, Photo, and Video Collections; MPV™, MPV Core Specification; Revision 1.01; Mar. 11, 2003; 133 pages.

OSTA.org—Optical Storage Technology Association; Digital Music, Photo, and Video Collections; MPV™, MPV Presentation Profile Specification; Revision 1.01; Mar. 11, 2003; 42 pages.

OSTA.org—Optical Storage Technology Association; Digital Music, Photo, and Video Collections; MPV™, Normalized Metadata Format Specification; Revision 1.01; Mar. 11, 2003; 42 pages.

Picture Archiving and Sharing Standard; A Joint Initiative; PASS (Everplay) Logical Disc Specification; Everplay; Version 1.101; Fuji Photo Film Co., Ltd.; Konica Minolta Photo Imaging, Inc.; Eastman Kodak Company; Feb. 2006; 73 pages.

Picture Archiving and Sharing Standard; A Joint Initiative; PASS (Everplay) Originating / Authoring System Requirements; Everplay; Version 1.101; Fuji Photo Film Co., Ltd.; Konica Minolta Photo Imaging, Inc.; Eastman Kodak Company; Feb. 2006; 36 pages.

Picture Archiving and Sharing Standard; A Joint Initiative; PASS (Everplay) Receiving / Playback System Requirements; Everplay; Version 1.101; Fuji Photo Film Co., Ltd.; Konica Minolta Photo Imaging, Inc.; Eastman Kodak Company; Feb. 2006; 29 pages.

Picture Archive and Sharing Standard (PASS) Version 1.01; An Initiative by Konica Minolta Photo Imaging, Inc.; Fuji Photo Film Co., Ltd.; Eastman Kodak Company; Mar. 2, 2005; 12 pages.

XHTML—Print Photo Templates for UPnP PrintEnhanced:1; for UPnP™ Version 1.0; Status: Design Complete—Version 1.0; May 4, 2005; 79 pages.

Photographic and Imaging Manufacturers Association, Inc.; PIMA 15740:2000; Approved Jul. 5, 2000; First Edition; Photography—Electronic still picture imaging—Picture Transfer Protocol (PTP) for Digital Still Photography Devices; 159 pages.

OSTA.org—Optical Storage Technology Association; Digital Music, Photo, and Video Collections; MPV™, XML Manifest Specification; Revision 1.01; Mar. 11, 2003; 23 pages.

OSTA.org—Optical Storage Technology Association; Digital Music, Photo, and Video Collections; MPV™, XML Manifest Specification; Revision 2.00; Jun. 14, 2005; 38 pages.

Regulations for PictBridge Mark and Logotype (Handling Rules and Specifications); PictBridge; 2003 Cannon Inc.; Fuji Photo Film Co., Ltd.; Hewlett-Packard Company; Olympus Optical Co., Ltd.; Seiko Epson Corporation; Sony Corporation; 5 pages.

PictBridge; Standard of Camera & Imaging Products Association; CIPA DC-001-2003; Digital Photo Solutions for Imaging Devices; Feb. 3, 2003; Published by Camera & Imaging Products Association; 113 pages.

Digital Still Camera Image; File Format Standard (Exchangeable image file format for Digital Still Cameras: Exif); Version 2.1; Jun. 12, 1998; Japan Electronic Industry Development Association (JEIDA); 172 pages.

(56) References Cited

OTHER PUBLICATIONS

Standard of Japan Electronics and Information Technology Industries Association; JEITA CP-3451; Exchangeable image file format for digital still cameras: Exif Version 2.2; Established in Apr. 2002; Prepared by Technical Standardiation Committee on AV & IT Storage Systems and Equipment; Published by Japan Electronics and Information Technology Industries Association; 154 pages.

CIPA; Implementer's Guidelines for CIPA DC-001-2003; Digital Photo Solutions for imaging Devices; Apr. 4, 2003; Published by Camera & Imaging Products Association; 154 pages.

Supplements for "implementer's Guidelines for CIPA DC-001-2003 Apr. 4, 2003" as of Jun. 3, 2003; 2 pages.

Japan Electronic Industry Development Association Atandard; Digital Still Camera Image File Format Standard (Exchangeable image file format for Digital Still Camera:Exif); Version 2.1; JEIDA-49-1998; Revised Dec. 1998; Revised Jun. 1998; Revised Oct. 1997; Established Nov. 1995; Japan Electronic Industry Development Association; 174 pages.

Japan Electronic Industry Development Association Standard; Design rule for Camera File system; Version 1.0; JEIDA-49-2-1998; Established Dec. 1998; Japan Electronic Industry Development Association; 47 pages.

DPOF (Digital Print Order Format) Specification Version 1.10 <Part 1>; Jul. 17, 2000; Canon Inc.; Eastman Kodak Company; Fuji Photo Film Co., Ltd.; Matsuchita Electric Industrial Co., Ltd.; 87 pages.

DPOF (Digital Print Order Format) Specification Version 1.10 <Part 2>; Jul. 17, 2000; Canon Inc.; Eastman Kodak Company; Fuji Photo Film Co., Ltd.; Matsuchita Electric Industrial Co., Ltd.; 48 pages.

Cannon, Inc., Fuji Photo Film Co., Ltd., Hewlett-Packard Company, Olympus Optical Co., Ltd., Seiko Epson Corporation, Sony Corporation , "Regulations for PictBridge Mark and Logotype (Handling Rules and Specifications)". May 12, 2003, 5 pages.

Albright et al., Shivaun. XHTML-Print/CSS Print Profile Guidelines for PrintEnhanced:1. For UPnP™ Version 1.0; Status: Design Complete Version 1.0 vols. Contributing Members of the UPnP™, May 4, 2005, 55 pages.

Albright et al., Shivaun. Printer:1 Device Template Version 1.01. UPnP™ Version 1.0; Status: Approved Standard vols. Aug. 8, 2002, 7 pages.

Albright et al., Shivaun. PrintEnhanced:1 Service Template Version 1.01. UPnP™ Version 1.0; Status: Standardized DCP vols. May 4, 2005, 81 pages.

Albright et al., Shivaun. PrintBasic:1 Service Template Version 1.01. UPnP™ Version 1.0; Status: Approved Standard vols. Aug. 8, 2002, 42 pages.

* cited by examiner

MULTIPLE MEDIA FORMAT SUPPORT FOR PRINTERS

CROSS-REFERENCE TO RELATED APPLICATIONS

This application claims the benefit of U.S. Provisional Application No. 60/826,265, filed on Sep. 20, 2006. The disclosure of the above application is incorporated herein by reference in its entirety.

FIELD

The present disclosure relates generally to multiple media support for printers and, more particularly, to provide an integrated design approach for multiple media format support on printers.

BACKGROUND

Computer printers, or printers, are hardware devices that generate permanent human-readable text and/or graphics (hard copies) of files stored in electronic form. Printers generate hard copies on physical print media such as paper or transparencies. Conventional printers are used as either computer peripherals that generally communicate with one computer terminal or as network printers that include network interfaces for serving any user on a network. Modern printers can directly interface with electronic media such as removable memory and/or media cards.

Media cards are data storage devices used in multiple media devices such as digital still cameras (DSCs), handheld and laptop computers, telephones, music players, home networks, digital versatile discs (DVDs), digital television, and other electronics. Several types of media cards such as Secure Digital, CompactFlash, SmartMedia, xD-Picture, and MultiMedia cards are manufactured having various capacities, access speeds, media formats, and/or interfaces.

Typically, multiple media devices such as DSCs are compatible with a specific type of media card. Furthermore, the multiple media devices generally store data on the media cards using a specific media format. Examples of various media formats implemented in DSCs include Digital Print Order format (DPOF), and Design Rule for Camera File system (DCF). Therefore, digital printers support respective media formats present on the media cards. Various media cards are manufactured to be compatible with the digital printers.

SUMMARY

A system for operating a multiple media printing device includes a memory module that stores print control data that corresponds to a plurality of data storage formats, a media reader module that selects one of the plurality of data storage formats based on one of a plurality of files stored on an external media storage device, and a media format module that processes image data stored on the media storage device based on the print control data that corresponds to the selected data storage format.

In other features, the system further comprises an interface driver module that detects the external media storage device and activates one of a plurality of interface drivers based on the external media storage device. The external media storage device includes one of Secure Digital card, a CompactFlash card, a SmartMedia card, a xD-Picture card, and a MultiMedia card. The media reader module determines that the external media storage device implements a MusicPhotoVideo format based on detecting a first descriptor file on the external media storage device. The media reader module determines that the external media storage device implements a Digital Print Order Format (DPOF) based on detecting an auto print file on the external media storage device. The media read module determines that the external media storage device includes a Design Rule for Camera File system when the media reader module fails to detect the auto print file on the external media storage device.

In other features, the system further comprises a PictBridge module that includes a PictBridge standard enabling communication between the media reader module and a digital still camera. The system further comprises a detection module that informs the media reader module of a connection between the PictBridge module and the digital still camera. The media format module processes the image data based on the print control data associated with the selected data storage format and generates a set of parameters corresponding to the image data stored on the external media storage device.

In other features, the system further comprises other firmware components of the multiple media printing device that receive the set of parameters from the media format module. The set of parameters relate to at least one of a type of print operation, resolution of a the image data, cropping of the image data, rotation of the image data, compression of the image data, and print language corresponding to the image data. A computer printing device includes the system.

A system for operating a multiple media printing device includes memory means for storing print control data that corresponds to a plurality of data storage formats, media reader means for selecting one of the plurality of data storage formats based on one of a plurality of files stored on an external media storage device, and media format means for processing image data stored on the media storage device based on the print control data that corresponds to the selected data storage format.

In other features, the system further comprises interface driver means for detecting the external media storage device and activates one of a plurality of interface drivers based on the external media storage device. The external media storage device includes one of Secure Digital card, a CompactFlash card, a SmartMedia card, a xD-Picture card, and a MultiMedia card. The media reader means determines that the external media storage device implements a MusicPhotoVideo format based on detecting a first descriptor file on the external media storage device. The media reader means determines that the external media storage device implements a Digital Print Order Format (DPOF) based on detecting an auto print file on the external media storage device. The media read means determines that the external media storage device includes a Design Rule for Camera File system when the media reader means fails to detect the auto print file on the external media storage device.

In other features, the system further comprises PictBridge means for including a PictBridge standard enabling communication between the media reader means and a digital still camera. The system further comprises detection means for informing the media reader means of a connection between the PictBridge means and the digital still camera. The media format means processes the image data based on the print control data associated with the selected data storage format and generates a set of parameters corresponding to the image data stored on the external media storage device.

In other features, the system further comprises other firmware components of the multiple media printing device that receive the set of parameters from the media format module. The set of parameters relate to at least one of a type of print operation, resolution of a the image data, cropping of the image data, rotation of the image data, compression of the image data, and print language corresponding to the image data. A computer printing means includes the system.

A method for operating a multiple media printing device includes storing print control data that corresponds to a plurality of data storage formats, selecting one of the plurality of data storage formats based on one of a plurality of files stored on an external media storage device, and processing image data stored on the media storage device based on the print control data that corresponds to the selected data storage format.

In other features, the method further comprises detecting the external media storage device and activating one of a plurality of interface drivers based on the external media storage device. The external media storage device includes one of Secure Digital card, a CompactFlash card, a Smart-Media card, a xD-Picture card, and a MultiMedia card. The method further comprises determining that the external media storage device implements a MusicPhotoVideo format based on detecting a first descriptor file on the external media storage device. The method further comprises determining that the external media storage device implements a Digital Print Order Format (DPOF) based on detecting an auto print file on the external media storage device. The method further comprises determining that the external media storage device includes a Design Rule for Camera File system when failing to detect the auto print file on the external media storage device.

In other features, the method further comprises including a PictBridge standard that enables communication between a media reader module and a digital still camera. The method further comprises determining a connection status between a PictBridge module and the digital still camera. The method further comprises processing the image data based on the print control data associated with the selected data storage format and generating a set of parameters corresponding to the image data stored on the external media storage device.

In other features, the method further comprises receiving the set of parameters from a media format module. The set of parameters relate to at least one of a type of print operation, resolution of a the image data, cropping of the image data, rotation of the image data, compression of the image data, and print language corresponding to the image data. A computer printing device includes the method.

A computer program stored for use by a processor for operating a multiple media printing device includes storing print control data that corresponds to a plurality of data storage formats, selecting one of the plurality of data storage formats based on one of a plurality of files stored on an external media storage device, and processing image data stored on the media storage device based on the print control data that corresponds to the selected data storage format.

In other features, the program further comprises detecting the external media storage device and activating one of a plurality of interface drivers based on the external media storage device. The external media storage device includes one of Secure Digital card, a CompactFlash card, a Smart-Media card, a xD-Picture card, and a MultiMedia card. The program further comprises determining that the external media storage device implements a MusicPhotoVideo format based on detecting a first descriptor file on the external media storage device. The program further comprises determining that the external media storage device implements a Digital Print Order Format (DPOF) based on detecting an auto print file on the external media storage device. The program further comprises determining that the external media storage device includes a Design Rule for Camera File system when failing to detect the auto print file on the external media storage device.

In other features, the program further comprises including a PictBridge standard that enables communication between a media reader module and a digital still camera. The program further comprises determining a connection status between a PictBridge module and the digital still camera. The program further comprises processing the image data based on the print control data associated with the selected data storage format and generating a set of parameters corresponding to the image data stored on the external media storage device.

In other features, the program further comprises receiving the set of parameters from a media format module. The set of parameters relate to at least one of a type of print operation, resolution of a the image data, cropping of the image data, rotation of the image data, compression of the image data, and print language corresponding to the image data. A computer printing device includes the program.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
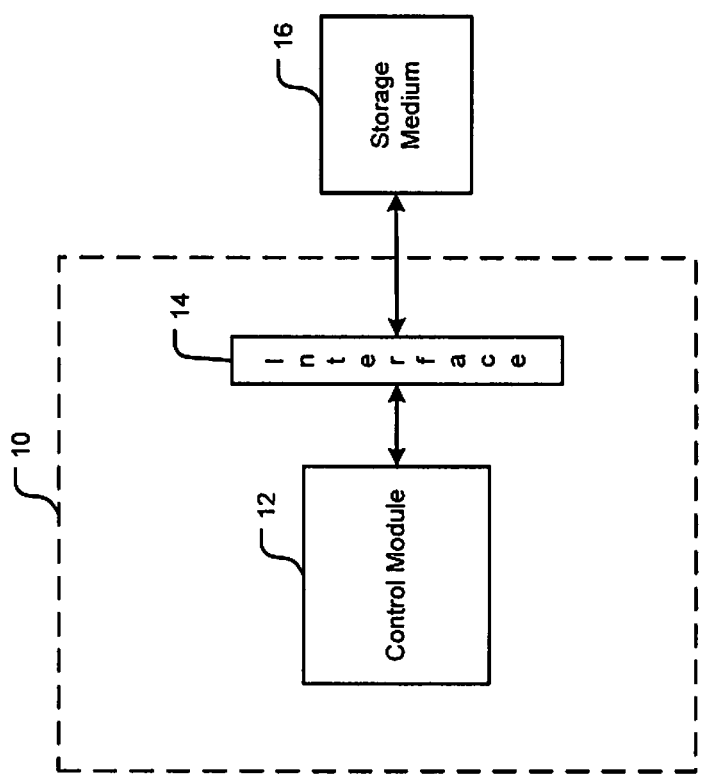
FIG. 1 is a functional block diagram of a multiple media printing device according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Generally, conventional digital printers provide limited media format support specifically to those media formats implemented on external media cards. External media cards are manufactured to be operable with the digital printer resulting in limited printer alternatives for a consumer. Additionally, many consumer multiple media devices (e.g. digital still cameras, laptop computers, telephones, video game consoles, and music players) typically use a particular type of media card, thereby further limiting the interoperability between various digital printers and consumer multiple media devices. The present disclosure enables a multiple media printing device to operate with several types of storage media that may employ various distinct media formats.

Referring to FIG. 1, an exemplary multiple media printing device 10 that implements a control system of the present disclosure is shown to include a control module 12 and an interface 14. The control module 12 communicates with an external storage medium 16 via the interface 14. The external storage medium 16 may include numerous types of media storage devices that respectively implement distinct media formats.

The control module 12 selectively initiates an interface driver based on the type of the storage medium 16 insertably connected to the multiple media printing device 10. Additionally, the control module 12 selectively executes a processing routine that corresponds to the distinct media format that the control module 12 detects on the external storage medium 16.

Figure 2:
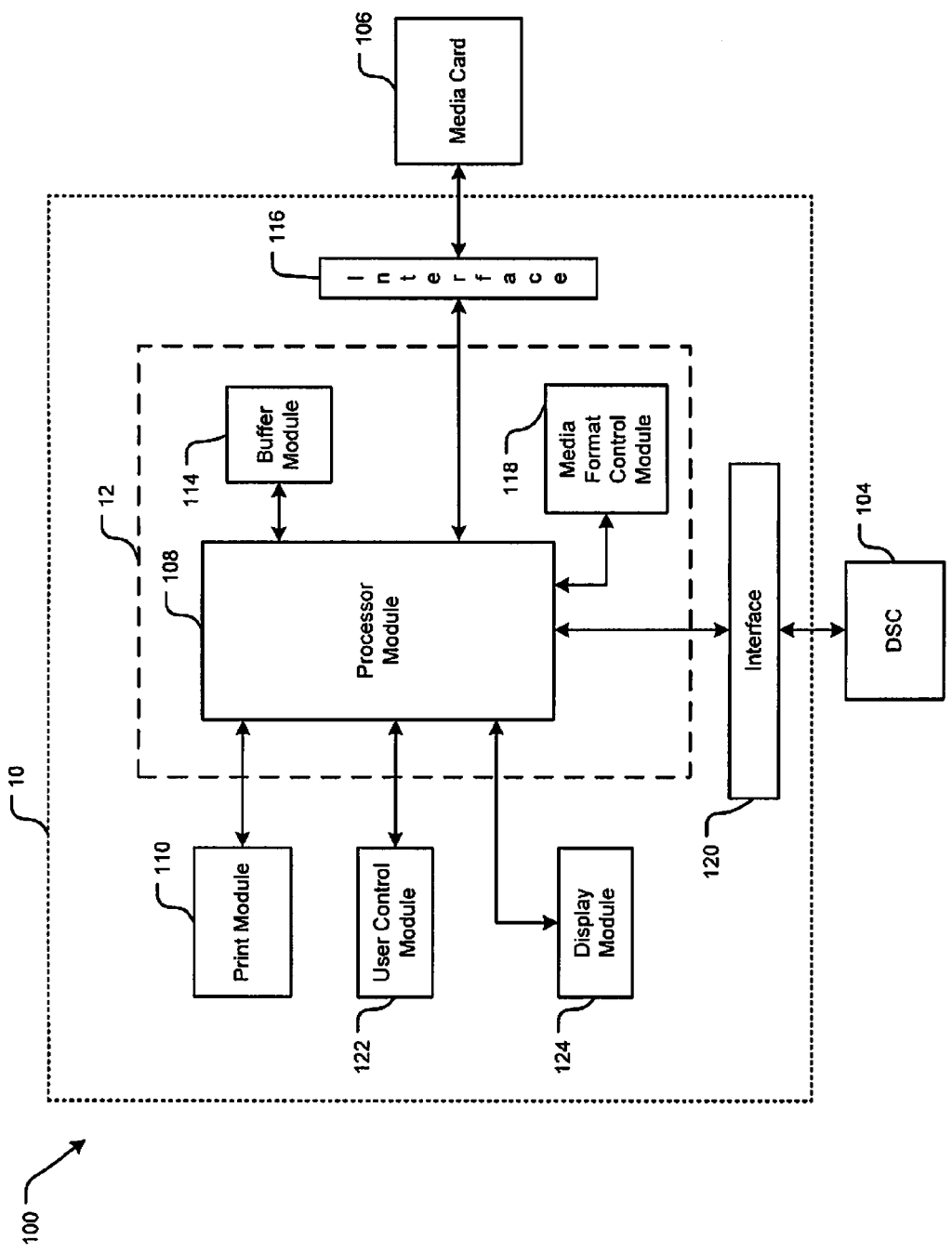
FIG. 2 is a functional block diagram of a print system according to the present disclosure.

Referring now to FIG. 2, an exemplary print system 100 that implements the control system of the present disclosure is shown to include the exemplary multiple media printing device 10, a digital still camera (DSC) 104, and an external media card 106. Those skilled in the art can appreciate that various other implementations of the support system are contemplated within other multiple media devices (e.g. handheld and laptop computers, telephones, music players, home networks, digital versatile discs (DVDs), digital television, and other electronics).

In the present implementation, the multiple media printing device 10 generates hard copies of data (e.g. text and/or graphics) stored on the media card 106 and/or received directly from the DSC 104. The multiple media printing device 10 communicates with the media card 106 and/or the DSC 104 via the interfaces 116 and 120, respectively. The media card 106 insertably connects to the multiple media printing device 10 and stores data that includes, but is not limited to, image data received from various multiple media devices. The media card 106 stores data in various formats or standards (referred to collectively as formats) including, but not limited to, a Digital Print Order format (DPOF), a Design Rule for Camera File (DCF) system, and a MusicPhotoVideo (MPV) standard.

The multiple media printing device 10 also includes the control module 12 that includes a processor module 108, a buffer module 114, and a media format control module 118. The processor module 108 communicates with the print module 110, the buffer module 114, the interface 116, the media format control module 118, the interface 120, a user control module 122, and a display module 124. The processor module 108 performs various processing on the image data including, but not limited to, decompression, interpolation, sharpening, and color and tone correction. The buffer module 114 temporarily stores image and/or control data associated with the processing of the image data received from the media card 106. The buffer module 114 can employ volatile memory such as random access memory (RAM), though other types of memory are contemplated. The multiple media printing device 10 operates based on firmware stored on the media format control module 118.

The media format control module 118 detects the media card 106 or the storage device of the DSC 104, alternatively referred to as the storage medium, and executes searches for files stored on the storage medium. Upon determining the media format implemented on the storage medium, the media format control module 118 processes image data stored on the storage medium based on the type of media format.

The processor module 108 controls the operation of the print module 110. The print module 110 prints text and/or graphics on a hard copy media (e.g. paper or transparencies). The print module 110 includes mechanisms such as motor driven rollers and a printing head (not shown). During operation of the multiple media printing device 10, the motor driven roller moves a hard copy media past the printing head. The printing head prints text and/or graphics on the hard copy media.

In the present implementation, the multiple media printing device 10 includes the display module 124 and the user control module 122 that enable a user/operator of the printer system 100 to selectively modify the controls of the multiple media printing device 10 via a user interface (e.g. touchpad and/or buttons). In various embodiments, the user/operator modifies the controls the multiple media printing device 10 via a multiple media device (e.g. DSC).

Figure 3:
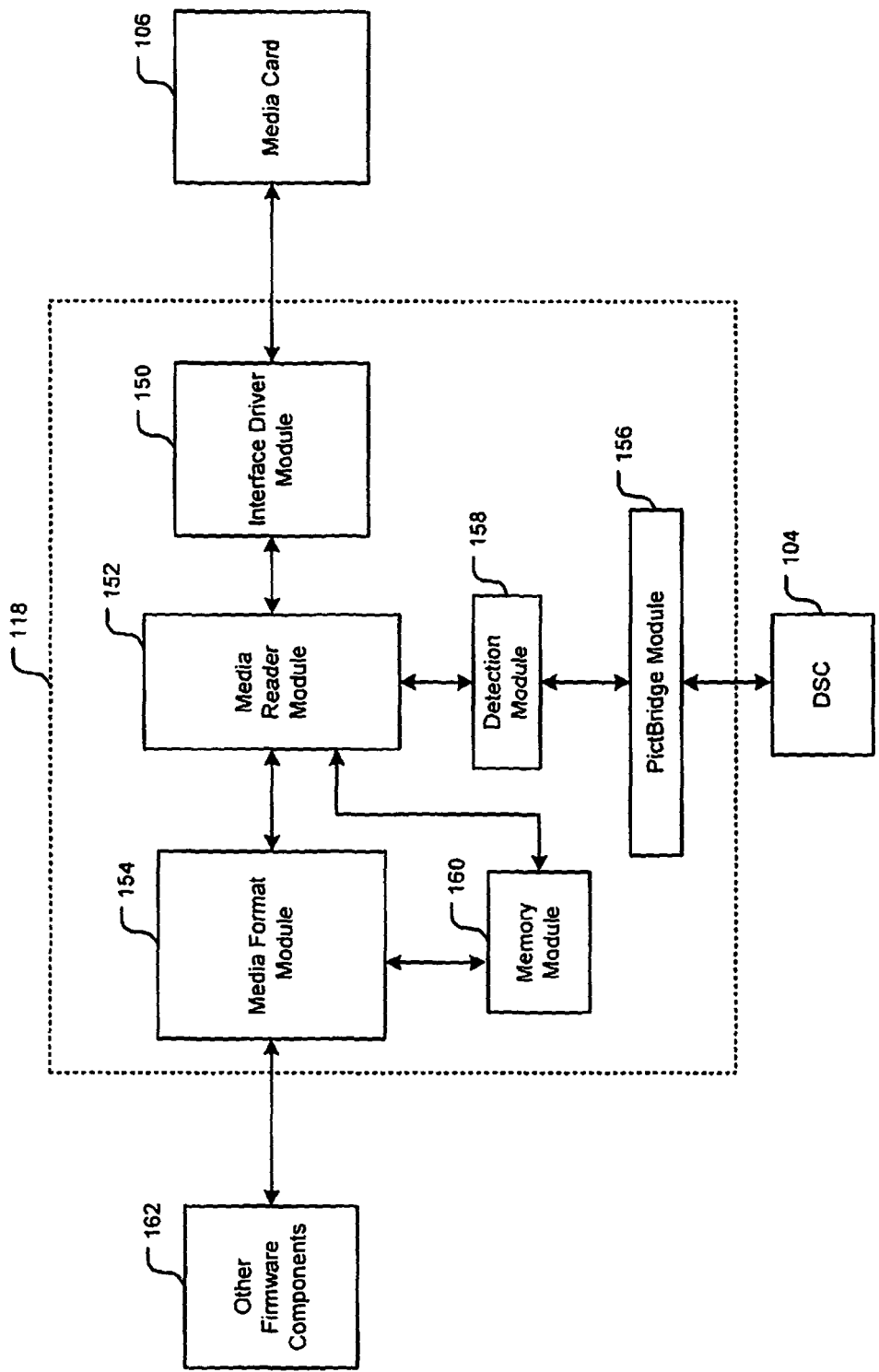
FIG. 3 is a functional block diagram of an exemplary memory module according to the present disclosure.

Referring now to FIG. 3, an exemplary implementation of the media format control module 118 is shown in more detail. The media format control module 118 implements the control system of the present disclosure. The media format control module 118 includes an interface driver module 150, a media reader module 152, a media format module 154, a PictBridge module 156, a detection module 158, and a memory module 160. The media reader module 152 communicates with the interface driver module 150, media format module 154, the detection module 158, and the memory module 160. The interface driver module 150 communicates with the media card 106. The interface driver module 150 detects the presence of the media card 106 and activates an interface driver based on the type of media card 106. More specifically, the interface driver module 150 activates an interface driver that corresponds to the type of the media card 106. The media card 106 may include, but is not limited to, Secure Digital, CompactFlash, SmartMedia, xD-Picture, and MultiMedia cards. In this manner, the media reader module 152 is able to browse and/or search a particular file system present on the media card 106.

The media card 106 stores data in various formats including, but not limited to, the Digital Print Order Format (DPOF), a Design Rule for Camera File system (DCF), and a MusicPhotoVideo (MPV) standard. The DPOF allows a user/operator to define attributes of the image data (e.g. image data reproduction information, title text associated with the image data, image data orientation, and/or paper size) stored on the media card 106 or other storage device. In the present implementation, the multiple media printing device 10 can communicate directly with a storage device (not shown) of the DSC 104 using application-layer interface modules such as the PictBridge module 156 without a connection to a host computer (not shown). Those skilled in the art can appreciate that various other interface modules are contemplated.

The PictBridge module 156 includes a set of protocols referred to as a PictBridge standard that allows image data to be printed directly from the DSC 104 to the multiple media printing device 10. The PictBridge module 156 allows for communications with the DSC 104 via a universal serial bus (USB) connection and typically supports the DPOF. Those skilled in the art will appreciate that other physical transport connections are contemplated. In the present implementation, the detection module 158 informs the media reader module 152 of the existence of a PictBridge connection to the DSC 104.

The DCF defines a file format and file system for DSCs that includes a directory structure, a file naming method, a character set, and a metadata format. Currently, the DCF represents the default industry standard for OSCs.

The MPV standard represents a standard for the interoperability and exchange of photo, music, and video collections and includes a family of specifications or profiles each of which addresses either different media types or multiple media device categories. The MPV standard assists in expressing, exchanging, processing, and reproducing metadata associated with digital music, photo, and video in various multiple media devices. The MPV standard defines a descriptor file or "manifest" file (e.g. index manifest file), metadata, and various practices to process data. Additionally, the MPV standard reproduces data including digital photos, videos, and audio stored in various storage mediums (e.g. media cards and/or DVDs). The index manifest file is an independent extensible markup language (e.g. XML) document file and is generated by grouping all the MPV elements, thereby allowing a MPV browser to explore the contents of a MPV profile (e.g. Portable Storage Profile) by working from the index manifest file.

The media reader module 152 performs searches of the image data stored on either one of the storage media using a plurality of distinct search criteria to determine the storage format employed by the storage medium. Each search criterion is associated with a particular data storage format. In the present implementation, the data storage format used by the storage medium includes one of the DCF, DPOF, and MPV. The disclosure anticipates use of the control system with various other formats implemented by other media cards and/or storage devices.

During a MPV search operation, the media reader module 152 searches the storage medium for an index manifest file. Typically, the index manifest file resides under a "root" directory stored on the storage medium. Upon detecting the index manifest file, the media reader module 152 uses the index manifest file to further search the storage medium for data including images, video, and audio files. In various embodiments, the index manifest file may contain references to default and or custom album manifest files. Those skilled in the art can appreciate that the default or custom album manifest files may be used to further search the storage medium.

During a DPOF search operation, the media reader module 152 searches the storage medium for an auto print file. Typically, the auto print file is stored in a miscellaneous directory located within a media root directory. However, if the media reader module 152 fails to locate the auto print file or the miscellaneous directory is absent, the media reader module 152 determines that the storage medium uses the default DCF system.

The media reader module 152 communicates the format employed by the storage medium to the media format module 154. The media format module 154 processes the image data according to specifications, or print control data, particular to the format identified by the media reader module 152. The media format module 154 retrieves the print control data for each format from the memory module 160. Typically, the memory module 160 includes reprogrammable non-volatile memory, including, but not limited to, erasable programmable read-only memory (EPROM).

During operation, the media format module 154 determines the type of print operation, or "job" (e.g. index, standard, multi-image, or specific size) when the image data is encoded using the DPOF. Additionally, the media format module 154 determines the resolution of a single job of the image data as well as additional parameters of the job including, but not limited to, cropping, rotation, data compression, and/or print language.

Therefore, the media format control module 118 provides an integrated solution that supports multiple media formats within a system independent of the physical interface. Particularly, the media format control module 118 supports the MPV standard which provides seamless data management and interoperability between various consumer multiple media devices lacking from various conventional printer implementations.

The media format module 154 transmits the parameters characterizing the job to other firmware components 162 (e.g. job scheduler, resource scheduler, print manager, and/or status manager) of the multiple media printing device 10.

Portions of the media format control module 118 may be implemented by one or more integrated circuits (IC) or computer chips. For example, the media reader module 152 and the media format module 154 may be implemented by a single chip.

Figure 4:
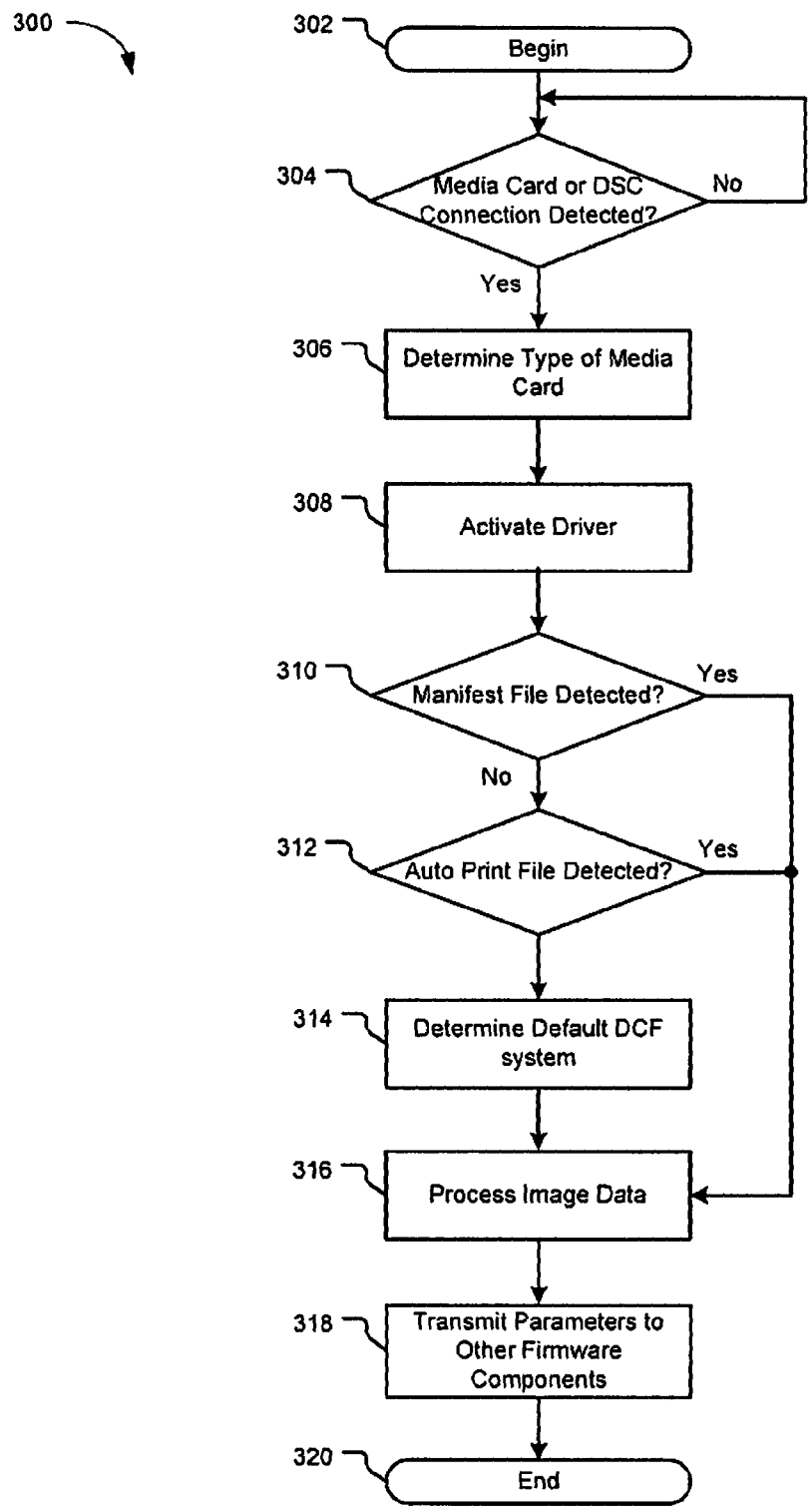
FIG. 4 is a flow diagram illustrating steps of executing the selective support system according to the present disclosure.

Referring now to FIG. 4, a method 300 for executing the control system is shown in more detail. The method 300 begins at step 302. In step 304, the interface driver module 150 or the detection module 158 determines the connection of a media card 106 or a DSC 104, respectively, to the media format control module 118. If the interface driver module 150 or the detection module 158 do not detect the presence of either a media card 106 or a DSC 104, respectively, the method 300 returns to step 304. If the interface driver module 150 or the detection module 158 detects either a media card 106 or a DSC 104, respectively, the method 300 proceeds to step 306.

In step 306, the interface driver module 150 determines the type of storage medium detected in step 304. In step 308 the interface driver module 150 activates a driver based on the type of storage medium. In step 310, the media reader module 152 determines whether a manifest file is stored on the storage medium. If the media reader module 152 detects a manifest file, the method 300 proceeds to step 316. If the media reader module 152 does not detect a manifest file, the method 300 proceeds to step 312.

In step 312, the media reader module 152 determines whether an auto print file is stored on the storage medium. If the media reader module 152 detects an auto print file, the method 300 proceeds to step 316. If the media reader module 152 does not detect an auto print file, the method 300 proceeds to step 314. In step 314, the media reader module 152 determines that the storage medium employs the default DCF system.

In step 316, the media format module 154 processes the image data stored on the storage medium based on the data storage format employed by the storage medium and generates parameters characterizing the image data. In step 318, the media format module 154 transmits the parameters to other firmware components 162. In step 320 the method 300 ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A multiple media printing device, comprising:
    a processor module, located on the multiple media printing device, configured to control printing operations of the multiple media printing device; and
    a media format control module, located on the multiple media printing device, in communication with the processor module, wherein the media format control module includes:
        a memory module, located on the multiple media printing device, configured to store print control data that corresponds to a plurality of data storage formats, wherein the plurality of data storage formats includes a MusicPhotoVideo format, a Digital Print Order Format, and a Design Rule for Camera File system format;
        an interface driver module, located on the multiple media printing device, configured to detect an external media storage device directly connected to the multiple media printing device and activate one of a plurality of interface drivers based on a type of the detected external media storage device;
        a media reader module, located on the multiple media printing device, configured to
            i) search, according to the activated interface driver, the external media storage device for a first file corresponding to the MusicPhotoVideo format, wherein the first file is an index manifest file of the MusicPhotoVideo format that includes metadata associated with image data stored on the external media storage device, and wherein the external media storage device is independent of the memory module,
            ii) select, if the first file is found, the MusicPhotoVideo format as a selected data storage format,
            iii) if the first file is not found, search the external media storage device for a second file corresponding to the Digital Print Order Format,
            iv) select, if the second file is found, the Digital Print Order Format as the selected data storage format, and
            v) if the second file is not found, select the Design Rule for Camera File system format as the selected data storage format; and
        a media format module, located on the multiple media printing device, configured to (i) receive the selected data storage format from the media reader module and (ii) process the image data stored on the external media storage device in an image file using the print control data stored in the memory module that corresponds to the selected data storage format.

2. The printing device of claim 1, wherein the external media storage device includes one of a Secure Digital card, a CompactFlash card, a SmartMedia card, a xD-Picture card, or a MultiMedia card.

3. The printing device of claim 1, wherein the media reader module is configured to determine that the external media storage device implements the MusicPhotoVideo format based on detecting a first descriptor file on the external media storage device.

4. The printing device of claim 1, wherein the media reader module is configured to determine that the external media storage device implements the Digital Print Order Format based on detecting an auto print file on the external media storage device.

5. The printing device of claim 4, wherein the media read module is configured to determine that the external media storage device includes a Design Rule for Camera File system when the media reader module fails to detect the auto print file on the external media storage device.

6. The printing device of claim 1, further comprising a PictBridge module to include a PictBridge standard enabling communication between the media reader module and a digital still camera.

7. The printing device of claim 6, further comprising a detection module configured to inform the media reader module of a connection between the PictBridge module and the digital still camera.

8. The printing device of claim 1, wherein the media format module is configured to i) process the image data based on the print control data associated with the selected data storage format and ii) generate a set of parameters corresponding to the image data stored on the external media storage device.

9. The printing device of claim 8, further comprising other firmware components of the multiple media printing device configured to receive the set of parameters from the media format module.

10. The printing device of claim 8, wherein the set of parameters relate to at least one of a type of print operation, resolution of the image data, cropping of the image data, rotation of the image data, compression of the image data, or print language corresponding to the image data.

* * * * *